Durgin & Walker,
Sieve.

N° 38,953. Patented June 23, 1863.

Witnesses:
F. P. Hale Jr.
Frederick Curtis.

Inventor.
Jas. O. Durgin
Jerh. Walker.
by their attorney
R. H. Eddy.

UNITED STATES PATENT OFFICE.

JAMES O. DURGIN AND JEREMIAH WALKER, OF YARMOUTH, MAINE.

IMPROVED BOXED SIEVE.

Specification forming part of Letters Patent No. 38,953, dated June 23, 1863.

*To all whom it may concern:*

Be it known that we, JAMES O. DURGIN and JEREMIAH WALKER, residents of Yarmouth, in the county of Cumberland and State of Maine, have invented an improved apparatus for sifting sugar, or other powdered or loose material or materials; and we do hereby declare the same to be fully described in the following specification, and represented in the accompanying drawings, of which—

Figure 1:
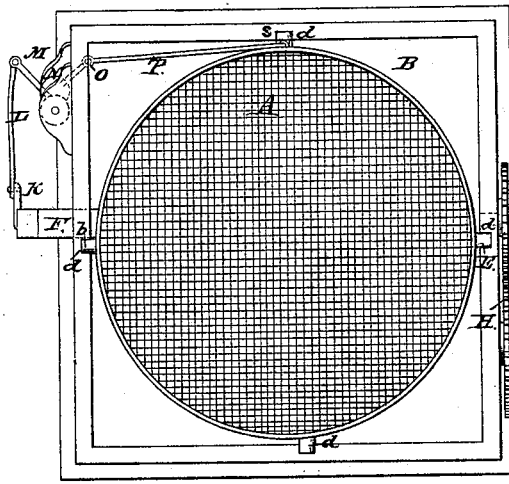
Figure 2:
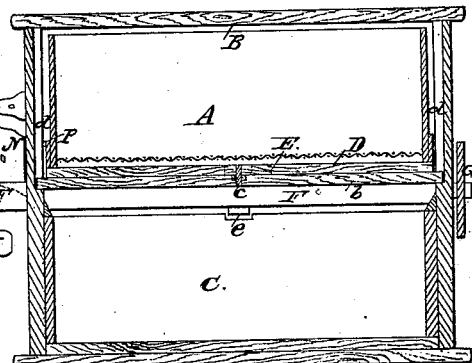

Figure 1 is a top view, and Fig. 2 a transverse section, of the same.

The nature or principle of our invention consists, or is to be found, in combining with a sieve, its case or box, and machinery for imparting to the sieve vertical and reciprocating rotary motions, as hereinafter explained, a supporting-bar and a guide-cross, the whole being applied together and to the case substantially in manner and so as to operate as hereinafter explained.

Figure 3:
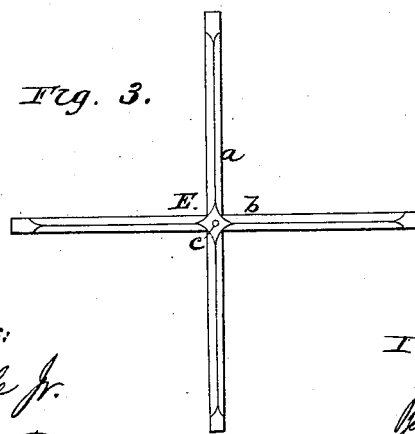

In the drawings, A denotes a common round sieve for sifting flour, sugar, or other articles. It is arranged within a square case or box, B, provided with a drawer, C, arranged below the sieve. The said sieve rests directly upon a supporting-bar, D, which, at its middle, is pivoted on a cross, E, formed of two bars, *a b*, crossing one another at right angles and at their middles, as shown in Fig. 3, the pivot *c* being extended up from the center of the cross and through the middle of the bar D. The said bar D turns freely on the said pivot, and serves to support the sieve. The ends of the bar of the cross are inserted in four vertical grooves, *d d d d*, formed within the sides of the box. Extending across the box and underneath the cross is a horizontal shaft, F, provided with two or any other suitable number of cams, *e e*, arranged as shown in Fig. 2. On one end of this shaft is a pinion, G, which engages with a driving-gear, H, provided with a crank, I, for putting it in revolution.

A crank, K, is fixed to the opposite end of the shaft F, and has a rod, L, jointed to it and to an arm, M, extending from an inclined shaft, N. Another arm, O, projects from the shaft N and is jointed to one end of a long rod, P, which at its other end hooks through a staple, *s*, projecting from the periphery of the sieve. By revolving the gear H the shaft F will be put in revolution, and in consequence thereof the sieve will not only be vibrated horizontally with reciprocating movements, but it will be moved vertically up and down, these combined motions operating to jar the material to be sifted, and cause it to fall through the meshes of the sieve. The supporting-bar D keeps the sieve off the cross, and thus prevents friction of the rim of the sieve thereon. By being disconnected from the sieve or the rim thereof, such bar, during the process of sifting, will work around more or less against the bottom surface of the sieve, and thus serve as a cleaner or clearer thereof of any of the material which may clog the meshes or gather on the under surface of the bottom. The cross serves to guide the sieve in its vertical movements.

We claim—

In combination with the sieve, its case, and the machinery for imparting to the sieve vertical and reciprocating rotary movements, as described, the supporting-bar D and the guide-cross E, the whole being applied together and to the case substantially in manner and so as to operate as hereinbefore specified.

JAS. O. DURGIN.
JEREMIAH WALKER.

Witnesses:
DANIEL L. MITCHELL,
ELIZA S. MITCHELL.